US012466381B2

(12) United States Patent
Adamczak et al.

(10) Patent No.: US 12,466,381 B2
(45) Date of Patent: Nov. 11, 2025

(54) FILTER DETECTION IN A SYSTEM FOR CAPTURING BRAKING PARTICLES

(71) Applicant: TALLANO TECHNOLOGIE, Boulogne Billancourt (FR)

(72) Inventors: Loïc Adamczak, Boulogne Billancourt (FR); Christophe Rocca-Serra, Paris (FR)

(73) Assignee: TALLANO TECHNOLOGIE, Boulogne Billancourt (FR)

( * ) Notice: Subject to any disclaimer, the term of this patent is extended or adjusted under 35 U.S.C. 154(b) by 564 days.

(21) Appl. No.: 17/802,893

(22) PCT Filed: Feb. 24, 2021

(86) PCT No.: PCT/EP2021/054609
§ 371 (c)(1),
(2) Date: Aug. 26, 2022

(87) PCT Pub. No.: WO2021/170680
PCT Pub. Date: Sep. 2, 2021

(65) Prior Publication Data
US 2023/0142603 A1     May 11, 2023

(30) Foreign Application Priority Data
Feb. 28, 2020   (FR) ........................................ 2002020

(51) Int. Cl.
*B60T 17/22*     (2006.01)
*F16D 65/00*     (2006.01)
(52) U.S. Cl.
CPC ........ *B60T 17/221* (2013.01); *F16D 65/0031* (2013.01)

(58) Field of Classification Search
CPC .. B60T 17/221; B60T 17/002; F16D 65/0031; B60Y 2306/15
See application file for complete search history.

(56) References Cited

U.S. PATENT DOCUMENTS 11,878,691 B2 *   1/2024   Adamczak .............. B03C 3/017
12,066,069 B2 *   8/2024   Adamczak ........... F16D 65/092
(Continued)

FOREIGN PATENT DOCUMENTS

FR     3 057 040     4/2018
FR     3081781 A1     12/2019
(Continued)

OTHER PUBLICATIONS

Korean Patent No. KR 100267658 to Kim published on Oct. 16, 2000.*
(Continued)

*Primary Examiner* — Pamela Rodriguez
(74) *Attorney, Agent, or Firm* — NIXON & VANDERHYE

(57) ABSTRACT

The invention relates to a system for capturing braking particles from a friction brake system, which has a vacuum source, a pneumatic circuit which connects the friction brake system to the vacuum source, and a filter located on the pneumatic circuit and mounted on a support. The capturing system comprises a control unit and a detection device for the filter which is capable of sending at least one signal to the control unit, the control unit being capable, on the basis of this signal, of identifying the absence of the filter and of informing a user of this absence of the filter.

7 Claims, 3 Drawing Sheets

(56) References Cited

U.S. PATENT DOCUMENTS

| | | |
|---|---|---|
| 2010/0065387 A1 | 3/2010 | Tsiberidis |
| 2011/0089091 A1 | 4/2011 | Grass |
| 2014/0262633 A1 | 9/2014 | Kunzler et al. |
| 2017/0374436 A1 | 12/2017 | Awiszus et al. |
| 2020/0046040 A1 | 2/2020 | Kanukurthy et al. |
| 2020/0049213 A1 | 2/2020 | Rocca-serra |
| 2021/0140498 A1 | 5/2021 | Kuemmerling |

FOREIGN PATENT DOCUMENTS

| | | |
|---|---|---|
| GB | 2538735 | 11/2016 |
| JP | 2001-286717 A | 10/2001 |
| JP | 2019529840 A | 10/2019 |
| KR | 10-2005-0069079 | 7/2005 |
| KR | 20100098427 A | 9/2010 |
| KR | 20190091258 A | 8/2019 |
| WO | 2016188809 A1 | 12/2016 |
| WO | 2019224034 A1 | 11/2019 |

OTHER PUBLICATIONS

International Search Report dated Mar. 26, 2021, for PCT/EP2021/054609, 6 pp., including English translation.
Written Opinion of the ISA dated Mar. 26, 2021, for PCT/EP2021/054609, 7 pp.
Office Action, issued in Japanese Patent Application No. 2022-551715 dated Mar. 11, 2024.
Office Action issued in Russian Patent Application No. 2022124637 dated Dec. 5, 2022.
Office Action issued in Indian Patent Application No. 202247049606 dated Nov. 30, 2022.
Office Action, issued in Korean Patent Application No. 10-2022-7031807 dated Apr. 17, 2024.

\* cited by examiner

[Fig. 1]
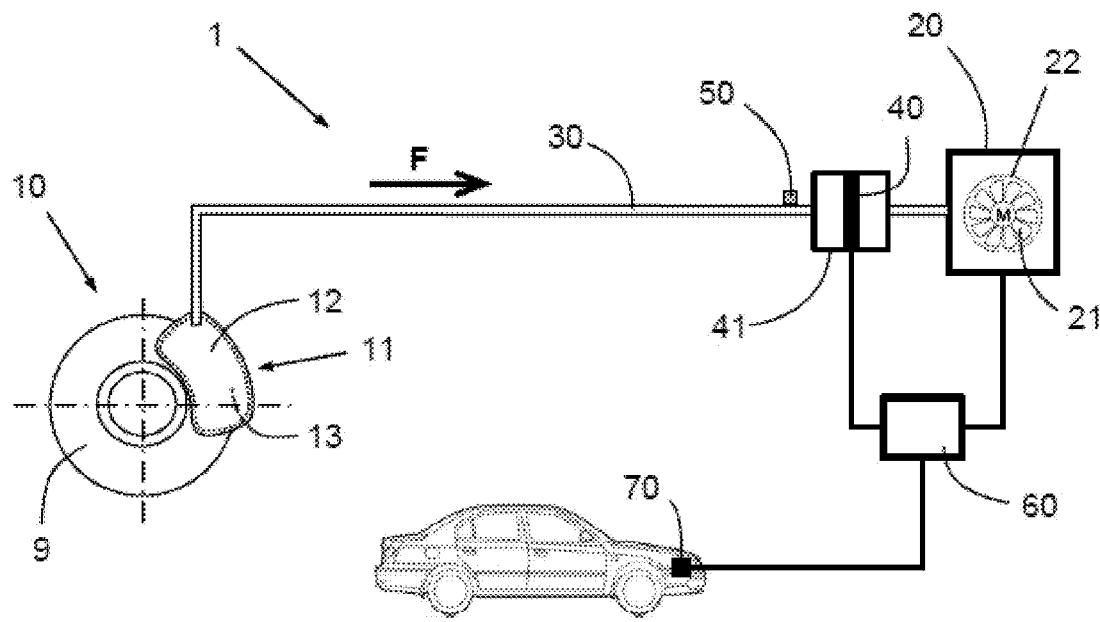
[Fig. 2]
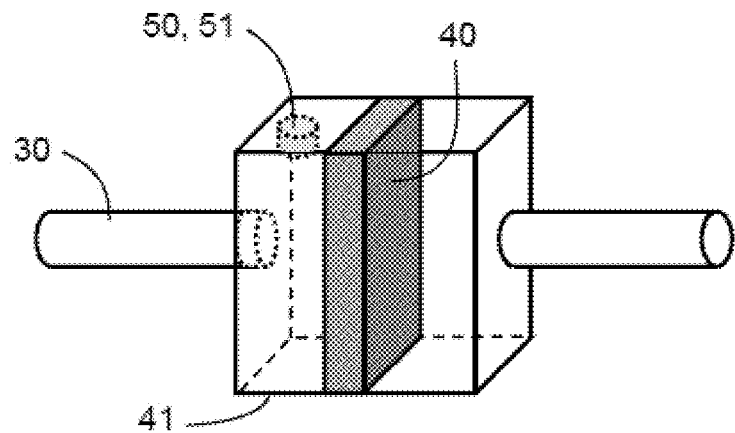

[Fig. 3]
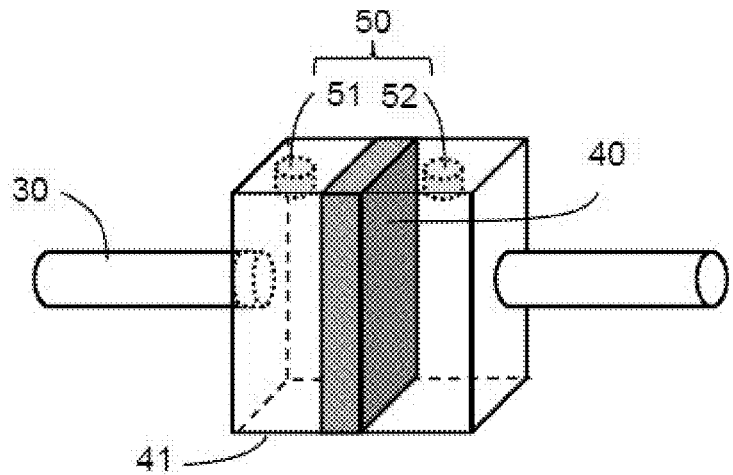
[Fig. 4]
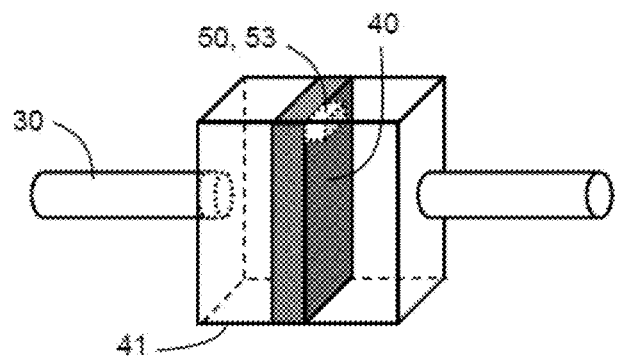
[Fig. 5]
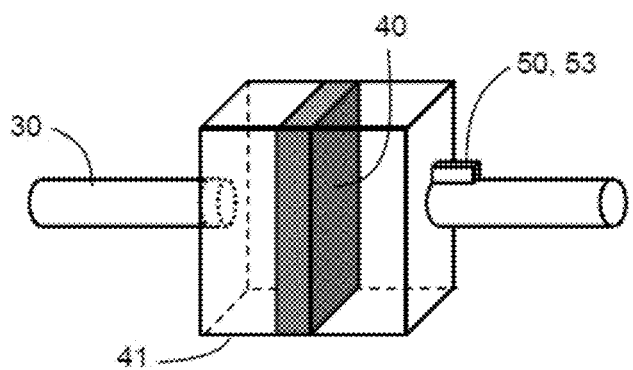

[Fig. 6]
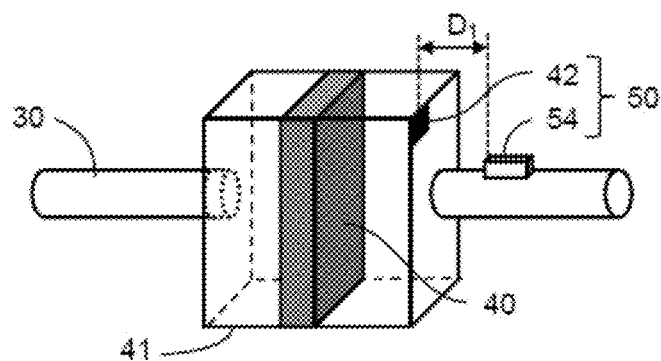
[Fig. 7]
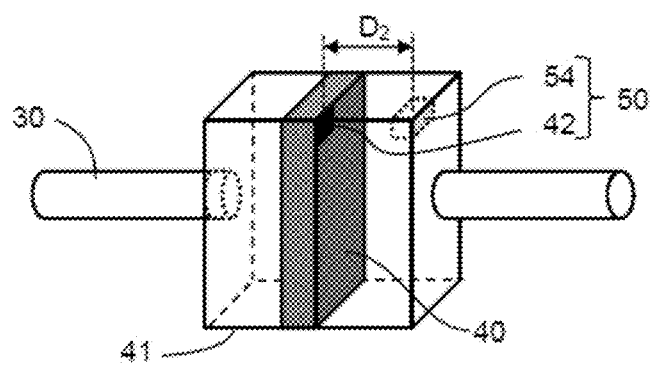

FILTER DETECTION IN A SYSTEM FOR CAPTURING BRAKING PARTICLES

CROSS-REFERENCE TO RELATED APPLICATION(S)

This application is the U.S. national phase of International Application No. PCT/EP2021/054609 filed Feb. 24, 2021, which designated the U.S. and claims priority to FR 2002020 filed Feb. 28, 2020, the entire contents of each of which are hereby incorporated by reference.

BACKGROUND OF THE INVENTION

Field of the Invention

This invention relates to a system for capturing the braking particles from a friction brake system, which comprises a vacuum source, a pneumatic circuit which connects the friction brake system to the vacuum source, and a filter located on the pneumatic circuit and mounted on a support.

Description of the Related Art

Such friction brake systems may equip road or rail vehicles. Such friction brake systems may also equip stationary rotor machines such as wind turbines or industrial machines.

In such systems, there is provided a vacuum source (for example a suction turbine driven by a motor) which is connected by a pneumatic circuit to the friction brake system, and a filter for collecting particles emitted by the braking system. This filter is placed upstream of the vacuum source, and prevents the passage of particles through the vacuum source and their release into the atmosphere. However, in certain situations, this filter may be missing, for example because it was not replaced during a vehicle service. Absence of the filter is detrimental, because the particles will then pass into the vacuum source and be released into the atmosphere. The filtering function is then no longer ensured.

SUMMARY OF THE INVENTION

This invention aims to remedy these disadvantages.

The invention aims to propose a system for capturing braking particles which makes it possible to inform the user of the vehicle of the absence of the capturing system filter, so that the user can act accordingly, and in particular can place a filter in the system.

This object is achieved due to the fact that the capturing system comprises a control unit and a filter detection device which is capable of sending at least one signal to the control unit, the control unit being capable, on the basis of this signal, of identifying the absence of the filter on the pneumatic circuit and of informing a user of this absence of the filter.

Due to these arrangements, an absence of the filter on the pneumatic circuit is detected and determined, and the user is immediately informed via the control unit. One will note that the control unit is capable of identifying both an absence of the filter on its support, and an absence of the support (with its filter) on the pipe. Indeed, in some cases it is more practical to change the assembly composed of the support and filter. The user can then act accordingly, and place a filter on its support or place a support (with its filter) on the pipe, in order to prevent the release of harmful particles into the atmosphere.

Advantageously, the detection device comprises a pressure sensor which is located on the pneumatic circuit upstream of the filter, the pressure sensor being capable of sending in a signal to the control unit a measurement of the pressure P1 in the pneumatic circuit upstream of the filter, the control unit, upon receiving this signal, being capable of comparing the measured pressure P1 with a reference pressure PR which is the pressure in the pneumatic circuit in the absence of a filter for the reference operating state ER of the vacuum source during the measurement of pressure P1 by the pressure sensor, the control unit being capable of informing a user of the absence of the filter on the pneumatic circuit when the measured pressure P1 is substantially equal to the reference pressure PR or is substantially equal to the atmospheric pressure.

Thus, in the case where the circuit or the filter support already includes a pressure sensor, it is not necessary to install an additional detection device.

Advantageously, the detection device comprises a first pressure sensor which is located on the pneumatic circuit upstream of the filter, the pressure sensor being capable of sending in a signal to the control unit a measurement of the first pressure P1 in the pneumatic circuit upstream of the filter, and a second pressure sensor which is located on the pneumatic circuit downstream of the filter and which is capable of sending in a signal to the control unit a measurement of the second pressure P2 in the pneumatic circuit downstream of the filter, the control unit, upon receiving this at least one signal, being capable of comparing the first measured pressure P1 and the second measured pressure P2, the control unit being capable of informing a user of the absence of the filter on the pneumatic circuit when the first measured pressure P1 and the second measured pressure P2 are substantially equal or when the first measured pressure P1 is substantially equal to the atmospheric pressure.

Thus, in the case where the circuit or the filter support already includes two pressure sensors, it is not necessary to install an additional detection device.

Advantageously, the detection device comprises a contact detector which is capable of detecting contact between the filter and the support, the contact detector being capable of sending a signal to the control unit when there is no contact between the filter and the support, the control unit, upon receiving the signal, being capable of informing a user of the absence of the filter.

The reliability of the filter detection is thus improved.

Advantageously, the detection device comprises a contact detector which is capable of detecting contact between the support and the circuit, the contact detector being capable of sending a signal to the control unit when there is no contact between the support and the circuit, the control unit, upon receiving the signal, being capable of informing a user of the absence of the filter.

The reliability of the filter detection is thus improved.

Advantageously, the detection device comprises an identifier which is carried by the filter or by the support and a contactless detector which is fixed close to the support and which is capable of detecting the presence of the identifier, the contactless detector being capable of sending a signal to the control unit when the identifier is not detected by the contactless detector, the control unit, upon receiving the signal, being capable of informing a user of the absence of the filter.

Thus, it is not necessary to establish an extremely precise positioning of the filter on its support: it is sufficient that the filter is mounted on the support.

For example, the identifier is carried by the support and the contactless detector is fixed to the pipe.

For example, the identifier is carried by the filter and the contactless detector is fixed to the support.

The invention also relates to a method for detecting the absence of a filter in a system for capturing braking particles from a friction brake system, this capturing system comprising a vacuum source, a pneumatic circuit which connects the friction brake system to the vacuum source, and a filter located on the pneumatic circuit and mounted on a support.

According to the invention, the method comprises the following steps
(a) A control unit and a filter detection device are provided, which form part of the capturing system;
(b) The detection device sends at least one signal to the control unit;
(c) On the basis of this signal, the control unit identifies the absence of the filter on the pneumatic circuit and informs a user of this absence of the filter.

BRIEF DESCRIPTION OF THE DRAWINGS

The invention will be better understood and its advantages will be more apparent, upon reading the following detailed description of embodiments shown as non-limiting examples. The description refers to the accompanying drawings, in which:

FIG. 1 is a schematic view of a capturing system according to the invention,

FIG. 2 is a perspective view of a housing carrying a filter, and of a device for detecting this filter in the capturing system of FIG. 1, FIG. 3 is a perspective view of a housing carrying a filter, and of a variant of the embodiment of a device for detecting this filter in the capturing system of FIG. 2, FIG. 4 is a perspective view of a housing carrying a filter, and of a second embodiment of a device for detecting this filter in the capturing system of FIG. 1, FIG. 5 is a perspective view of a housing carrying a filter, and of a variant of the second embodiment of a device for detecting this filter in the capturing system of FIG. 1, FIG. 6 is a perspective view of a housing carrying a filter, and of a third embodiment of a device for detecting this filter in the capturing system of FIG. 1, FIG. 7 is a perspective view of a housing carrying a filter, and of a variant of the third embodiment of a device for detecting this filter in the capturing system of FIG. 1.

DESCRIPTION OF THE PREFERRED EMBODIMENTS

FIG. 1 schematically represents a particle capturing system 1 according to the invention, these particles being emitted by a friction brake system 10.

This friction brake system 10 comprises a brake pad 11 for braking a vehicle. This pad 11 comprises a backing plate 12 and a lining 13 made of friction material fixed to the backing plate 12. In FIG. 1, the pad 11 is viewed from below, the plate 12 being in the foreground.

The pad 11 (first pad) is facing a disc 9 which is driven by the wheel of the vehicle. A second identical pad (not visible) is located on the other side of the disc 9 and opposite the first pad 11 so that these two pads sandwich the disc 9. Braking of the disc 9 is achieved by friction of the two linings (13) against the disc 9 when these two pads approach the disc 9.

The capturing system 1 comprises a pneumatic circuit 30 and a vacuum source 20. The pad 11 and the second pad are connected to the vacuum source 20 via this pneumatic circuit 30. For example, the vacuum source 20 comprises an electric motor 21 and a suction turbine 22 which is driven by this electric motor 21.

During operation, the vacuum source 20 is capable of suctioning in the particles upon their emission by the linings (13), through the pneumatic circuit 30. The direction of circulation of the air and particles during normal operation is indicated by the arrow F in FIG. 1. The arrow F therefore indicates a flow from upstream to downstream. The capturing system 1 further comprises a filter 40 which is located on the circuit 30, meaning that it is traversed by the air which circulates in the circuit 30. This filter 40 is mounted on a support 41 which is fixed to the pipe 30. For example, the support 41 is a housing which houses the filter 40 therein, as shown in the figures. The filter 40 thus separates the housing 41 into an upstream portion and a downstream portion. The air coming from the upstream portion of the circuit 30 enters the housing 41 at the upstream end of the housing 41, passes through the filter 40, and exits the housing 41 at the downstream end of the housing 41 to enter the downstream portion of the circuit 30.

The capturing system 1 further comprises a control unit 60 and a detection device 50 for detecting the filter 40. This control unit 60 and this detection device 50 are used to identify an absence of the filter 40 on its support 41, or an absence of the support 41 on the pipe 30 (and consequently an absence of the filter 40). The control unit 60 receives signals from the detection device 50 (which comprises an element for generating and sending these signals), and is also capable of controlling the vacuum source 20 and receiving information therefrom. These interactions between the control unit 60, the detection device 50, and the vacuum source 20 are schematically represented in FIG. 1 by solid lines. These interactions may be implemented by electric lines. The operation of this control unit 60 and of this detection device 50 is described below.

During operation of the capturing system 1, the detection device 50 sends at least one signal to the control unit 60. "At least one signal" is understood to mean the sending of a continuous signal, or a signal at regular intervals, or an isolated signal when an absence of the filter 40 on its support 41 is initially detected. The control unit 60 identifies the absence of the filter 40 on the basis of this signal, then informs a user of the absence of the filter 40. This information may be provided by any means, for example by displaying text such as "Filter missing" or a logo or an indicator light on the vehicle's dashboard, and/or for example by stimulation of the user by vibrations via a vibratory system located in the seat and controlled by the control unit 60.

In addition, this information may be accompanied by a limitation of the speed of the vehicle, using a limiter 70 which is controlled by the control unit 60 (FIG. 1). The generation of particles during braking is consequently reduced, and the release of these harmful particles into the vacuum source 20 is also reduced.

A first embodiment of the detection device 50 for detecting the filter 40 is described below, with reference to FIG. 2. FIG. 2 is a more detailed view of the support 41, the filter 40, and the detection device 50.

The detection device 50 comprises a (first) pressure sensor 51 which is located on the pneumatic circuit 30, upstream of the filter 40. Ideally, the pressure sensor 51 is located sufficiently close to the filter 40 so that the pressure measured by the pressure sensor 51 is identical to the pressure where the filter 40 is, or where it would be if it were present. Thus, the pressure sensor 51 is located either on the pneumatic circuit 30 close to the support 41 of the filter 40 (which makes it possible to identify an absence of the support 41), or in the support 41 for the filter 40 as represented in FIG. 2. "Located in the support 41" is understood to mean that the pressure sensor is located on the support, or in the support if this support is a housing, and in all cases this sensor measures the pressure at the location of this support 41.

The pressure sensor 51 is capable of measuring the (first) pressure P1 in the pneumatic circuit 30 upstream of the filter 40, and the detection device 50 is capable of sending this measurement in a signal to the control unit 60. During this measurement, the vacuum source 20 operates according to an operating state called the reference operating state ER. This operating state is characterized by a parameter which is for example the speed of rotation V of the suction turbine 22. Thus, in the reference operating state ER, the suction turbine 22 rotates at a speed of rotation VR. The control unit 60 has a reference pressure PR in memory, which is the pressure generated in the pneumatic circuit 30 in the absence of a filter 40 for the reference operating state ER of the vacuum source 20. It is understood that this reference pressure PR varies as a function of this reference operating state ER. Thus, the reference pressure PR varies as a function of the speed of rotation VR of the turbine 22. The control unit 60, upon receiving the signal comprising the pressure P1 measured in the pneumatic circuit 30, compares this measured pressure P1 with the reference pressure PR. This reference pressure PR corresponds to the pressure in the pneumatic circuit 30 in the absence of a filter 40 for the reference operating state ER of the vacuum source 20, and the measurement of the first pressure P1 by the pressure sensor 51 is performed during this reference operating state ER. Consequently, if the first pressure P1 is substantially equal to the reference pressure PR, this means that the filter 40 is absent from its support 41 (or that the filter 40 is torn), or that the support 41 (and therefore the filter 40) is absent although the upstream portion of the circuit 30 and the downstream portion of the circuit 30 are connected to the place where the support 41 should be located. Indeed, one will note that if the filter 40 is present, then the pressure upstream of the filter 40 is higher than the reference pressure PR because the filter 40, even when not clogged, contributes to preventing the passage of air. Thus, in the situation where P1 is substantially equal to PR, the control unit 60 informs the user of the absence of the filter 40. "Substantially equal" is understood to mean that the pressure is within a restricted interval around the reference pressure. For example, this interval is +/−1%, or +/−2%, or +/−5%, or +/−10% of the reference pressure value.

In the particular situation where, for the reference operating state ER, the support 41 is absent and the upstream portion of the circuit 30 and the downstream portion of the circuit 30 are not connected, then the measured pressure P1 is substantially equal to the atmospheric pressure. Also in this case, the control unit 60 informs the user of the absence of the filter 40.

A variant of the first embodiment is described below, in which the detection device 50 comprises a second pressure sensor 52 in addition to the first pressure sensor 51. This variant is illustrated in FIG. 3. The first pressure sensor 51 is located upstream of the filter 40, on the circuit 30. The second pressure sensor 52 is located downstream of the filter 40, on the circuit 30. The configuration where the first sensor 51 is located upstream of the support 41 and where the second sensor 52 is located downstream of the support 41 makes it possible to identify an absence of the support 41. For example, the first sensor 51 and the second sensor 52 are located in the support 41, as illustrated in FIG. 3. The first pressure sensor 51 is capable of measuring a first pressure P1 in the pneumatic circuit 30 upstream of the filter 40, and the detection device 50 is capable of sending this measurement in a signal to the control unit 60. In parallel, for example simultaneously, the second pressure sensor 52 is capable of measuring a second pressure P2 in the pneumatic circuit 30 downstream of the filter 40, and the detection device 50 is capable of sending this measurement in a signal to the control unit 60. For example, the measurement of the first pressure P1 and the measurement of the second pressure P2 are sent in the same signal. The control unit 60, upon receiving this or these signals, is capable of comparing the first pressure P1 with the second pressure P2. If the first pressure P1 is substantially equal to the second pressure P2, this means that the filter 40 is absent from its support 41 (or that the filter 40 is torn), or that the support 41 (and therefore the filter 40) is absent although the upstream portion of the circuit 30 and the downstream portion of the circuit 30 are connected to the place where the support 41 should be located. Indeed, one will note that if the filter 40 is present, then the pressure upstream of the filter 40 is greater than the pressure downstream of the filter 40. Thus, in the situation where P1 is substantially equal to P2, the control unit 60 informs the user of the absence of the filter 40.

In the particular situation where, during operation of the capturing system, the support 41 is absent and where the upstream portion of the circuit 30 and the downstream portion of the circuit 30 are not connected, then the measured pressure P1 is substantially equal to the atmospheric pressure. Also in this case, the control unit 60 informs the user of the absence of the filter 40.

A second embodiment of the detection device 50 for detecting the filter 40 is described below, with reference to FIGS. 4 and 5.

The detection device 50 comprises a contact detector 53. In a first variant illustrated in FIG. 4, this contact detector 53 is mounted on the support 41 such that when the filter 40 is placed in (or on) the support 41, the filter 40 is in physical contact with the contact detector 53. This physical contact is achieved for example by the filter 40 touching an element that is part of the contact detector 53. For example this element is a retractable contactor with return (spring-loaded), for which the retraction movement generates a signal. Alternatively, this physical contact is achieved for example by cooperation between a male element mounted on the contact detector 53 (respectively on the filter 40) and a female element mounted on the filter 40 (respectively on the contact detector 53). The contact detector 53 is thus capable of detecting contact between the filter 40 and the support 41, and therefore the presence of the filter 40 in (or on) the support 41. When there is no contact between the filter 40 and the support 41, meaning that the filter 40 is absent from the support 41, the detection device 50 sends a signal to the control unit 60. For example, this signal is sent at regular intervals as long as the filter 40 is absent from the support 41. The control unit 60, upon receiving this signal, informs a user of the absence of the filter 40.

In a second variant illustrated in FIG. 5, the contact detector 53 is mounted on the circuit 30, upstream or downstream of the support 41, such that when the support 41 is placed on the circuit 30, the support 41 is in physical contact with the contact detector 53. This physical contact is achieved for example by the support 41 touching an element that is part of the contact detector 53. Alternatively, this physical contact is achieved for example by engagement between a male element mounted on the contact detector 53 (respectively on the support 41) and a female element mounted on the support 41 (respectively on the contact detector 53). When there is no contact between the support 41 and the pipe 30, meaning that the support 41 is not mounted on the pipe 30 (and therefore the filter 40 is absent), the detection device 50 sends a signal to the control unit 60. For example, this signal is sent at regular intervals as long as the support 41 is absent from the pipe 30. The control unit 60, upon receiving this signal, informs a user of the absence of the filter 40.

A third embodiment of the detection device 50 for detecting the filter 40 is described below, with reference to FIGS. 6 and 7.

The detection device 50 comprises a contactless detector 54 and an identifier (tag) 42 which is carried by the filter 40 or by the support 41. The contactless detector 54 is capable of detecting the presence of the identifier 42 within a certain volume VO around this detector 54. This detection is carried out for example with RFID technology. RFID technology groups those technologies where the identifier is powered remotely by the detector. The contactless detector 54 is fixed close to the support 41, meaning that the identifier 42 (whether carried by the filter 40 or by the support 41) is located within the volume VO around the contactless detector 54.

In a first variant illustrated in FIG. 6, the contactless detector 54 is fixed to the pipe 30 upstream or downstream of the support 41, and the identifier 42 is carried by the support 41. Thus, the contactless detector 54 is located at a distance D1 from the identifier 42 when the support 41 is mounted on the pipe 30, and the contactless detector 54 is calibrated so that if the distance between itself and the identifier 42 is greater than the distance D1, meaning that if the support 41 (and therefore the filter 40) is absent from the pipe 30, the identifier 42 is not detected. In this case, the detection device 50 sends a signal to the control unit 60. For example, this signal is sent at regular intervals as long as the support 41 is absent from the pipe 30. The control unit 60, upon receiving this signal, informs a user of the absence of the filter 40. In this variant, the identifier 42 could be carried by the filter 40 as long as the contactless detector 54 is located at distance D1 from the identifier 42.

In a second variant illustrated in FIG. 7, the contactless detector 54 is fixed on the support 41 (for example it is placed within the housing when the support 41 is a housing), and the identifier 42 is carried by the filter 40, such that the contactless detector 54 is located at a distance D2 from the identifier 42 when the filter 40 is mounted on the support 41. The contactless detector 54 is calibrated so that if the distance between itself and the identifier 42 is greater than the distance D2, meaning that if the filter 40 is absent from the support 41, the identifier 42 is not detected. In this case, the detection device 50 sends a signal to the control unit 60. For example, this signal is sent at regular intervals as long as the filter 40 is absent from the support 41. The control unit 60, upon receiving this signal, informs a user of the absence of the filter 40.

The various embodiments described above may be used alone, or in combinations of two or more.

In certain embodiments, in particular in the third embodiment described above with a male-female engagement between the filter 40 and the contact detector 53 mounted on the support 41, the support 41 is for example capable of receiving only a certain type of filter 40 (those filters 40 whose male element (respectively female) is capable of engaging with the female element (respectively male) of the contact detector 53. Thus, one can ensure that only a certain filter 40 (for example of a given quality or brand) is mounted on the support 41. Similarly, in the case of a male-female engagement between the support 41 and the contact detector 53 mounted on the pipe 30, the pipe 30 is for example only capable of receiving a certain type of support 41. Thus, it can be ensured that only a certain support 41 carrying a certain filter 40 (for example of a given quality or brand) is mounted on the pipe 30.

In the fourth embodiment, the identifier 42 may be identical for any filter 40 or support 41, in which case this identifier 42 only serves to determine whether the filter 40 is present or absent on the circuit 30. Alternatively, the identifier 42 may be distinct (via a code that it contains) for each filter 40 (or each support 41), or for each type of filter 40 (or each type of support 41). In the latter case, the contactless detector 54 may be configured to detect only identifiers 42 corresponding to a certain type of filter 40 (or support 41 carrying this type of filter 40), which makes it possible to ensure that only this type of filter 40 is mounted on the pipe 30.

The invention also relates to a method for detecting the absence of a filter 40 in a system 1 for capturing braking particles from a friction brake system 10. As described above, this capturing system 1 comprises a vacuum source 20, a pneumatic circuit 30 which connects the friction brake system 10 to the vacuum source 20, and a filter 40 which is located on the pneumatic circuit 30 and which is mounted on a support 41. The method comprises the following steps:

(a) A control unit 60 and a detection device 50 for detecting said filter 40 are provided, which are part of the capturing system 1;
(b) The detection device 50 sends at least one signal to the control unit 60;
(c) On the basis of this signal, the control unit 60 identifies the absence of the filter 40 on the pneumatic circuit 30, and informs a user of this absence of the filter 40.

The invention claimed is:

1. A system for capturing braking particles from a friction brake system, the capturing system comprising:
a vacuum source;
a pneumatic circuit which connects said friction brake system to said vacuum source;
a filter disposed on said pneumatic circuit and mounted on a support;
a controller; and
a detection device configured to detect said filter, the detection device being configured to send at least one signal to said controller, said detection device comprising exactly one pressure sensor which is located on said pneumatic circuit upstream of said filter, said pressure sensor being configured to send a measurement of a pressure ($P_1$) in said pneumatic circuit upstream of said filter in the at least one signal to said controller,
wherein said controller is configured, upon receiving the at least one signal, to compare said measured pressure ($P_1$) with a reference pressure ($P_R$) which is the pressure in said pneumatic circuit in an absence of a filter for a reference operating state of said vacuum source during said measurement of pressure ($P_1$) by said pressure sensor, said controller being configured to inform a user of the absence of said filter on said pneumatic circuit when said measured pressure ($P_1$) is substantially equal to said reference pressure ($P_R$) or is substantially equal to the atmospheric pressure.

2. The capturing system according to claim 1, wherein said detection device comprises a contact detector which is configured to detect contact between said filter and said support, said contact detector being configured to send a signal to said controller when there is no contact between said filter and said support, and said controller, upon receiving said signal when there is no contact between the filter and the support, is configured to inform the user of the absence of said filter.

3. The capturing system according to claim 1, wherein said detection device comprises a contact detector which is configured to detect contact between said support and said circuit, said contact detector being configured to send a signal to said controller when there is no contact between said support and said pneumatic circuit, and said controller, upon receiving said signal when there is no contact between the support and the pneumatic circuit, being configured to inform the user of the absence of said filter.

4. The capturing system according to claim 1, wherein said detection device comprises an identifier which is carried by one of said filter and said support, and a contactless detector which is fixed close to said support and which is configured to detect the presence of said identifier, said contactless detector being configured to send a signal to said controller when said identifier is not detected by said contactless detector, and said controller, upon receiving said signal when the identifier is not detected by contactless detector, is configured to inform the user of the absence of said filter.

5. The capturing system according to claim 4, wherein said identifier is carried by said support and said contactless detector is fixed to said pneumatic circuit.

6. The capturing system according to claim 4, wherein said identifier is carried by said filter and said contactless detector is fixed to said support.

7. A method for detecting the absence of a filter in a system for capturing braking particles from a friction brake system, the capturing system including a vacuum source, a pneumatic circuit which connects said friction brake system to said vacuum source, and the filter located on said pneumatic circuit and mounted on a support, said method comprising:

providing a controller and a detection device for said filter, which form part of said capturing system, the detection device comprising exactly one pressure sensor which is disposed on said pneumatic circuit upstream of said filter;

sending, by the detection device, at least one signal of a measurement of a pressure ($P_1$) in said pneumatic circuit upstream of said filter, to said controller;

comparing, by the controller, based on said at least one signal, said measured pressure ($P_1$) with a reference pressure ($P_R$) which is the pressure in said pneumatic circuit in an absence of a filter for a reference operating system of the vacuum source; and informing a user of the absence of said filter on said pneumatic circuit when said measured pressure ($P_1$) is substantially equal to said reference pressure ($P_R$) or is substantially equal to the atmospheric pressure.

* * * * *